United States Patent
Hu et al.

(10) Patent No.: US 12,177,912 B2
(45) Date of Patent: Dec. 24, 2024

(54) METHOD AND DEVICE OF SLRB CONFIGURATION FOR NR V2X SIDELINK UE

(71) Applicant: LENOVO (BEIJING) LIMITED, Beijing (CN)

(72) Inventors: Jie Hu, Beijing (CN); Jing Han, Beijing (CN); Haiming Wang, Beijing (CN); Lianhai Wu, Beijing (CN); Jie Shi, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 379 days.

(21) Appl. No.: 17/634,907

(22) PCT Filed: Aug. 13, 2019

(86) PCT No.: PCT/CN2019/100380
§ 371 (c)(1),
(2) Date: Feb. 11, 2022

(87) PCT Pub. No.: WO2021/026767
PCT Pub. Date: Feb. 18, 2021

(65) Prior Publication Data
US 2022/0287115 A1  Sep. 8, 2022

(51) Int. Cl.
*H04W 76/14* (2018.01)
*H04W 28/02* (2009.01)

(52) U.S. Cl.
CPC ....... *H04W 76/14* (2018.02); *H04W 28/0268* (2013.01)

(58) Field of Classification Search
CPC . H04W 76/14; H04W 28/0268; H04W 28/24; H04W 76/12; H04W 76/27
See application file for complete search history.

(56) References Cited

U.S. PATENT DOCUMENTS

| | | | |
|---|---|---|---|
| 2018/0343692 A1 | 11/2018 | Lee et al. | |
| 2021/0007002 A1* | 1/2021 | Kang | H04W 40/24 |
| 2021/0329487 A1* | 10/2021 | Wang | H04W 28/24 |
| 2021/0410129 A1* | 12/2021 | Freda | H04W 72/543 |
| 2022/0150871 A1* | 5/2022 | Luo | H04L 1/1861 |

(Continued)

FOREIGN PATENT DOCUMENTS

| | | |
|---|---|---|
| WO | 2019029375 A1 | 2/2019 |
| WO | 2019149182 A1 | 8/2019 |
| WO | WO-2021128218 A1 * | 7/2021 |

OTHER PUBLICATIONS

3GPP TSG-RAN WG2 Meeting #106 R2-1907454 Reno, USA, May 13-17, 2019 Agenda Item: 11.4.6 Source: Huawei, HiSilicon (Year: 2019).*

(Continued)

*Primary Examiner* — Deepa Belur
(74) *Attorney, Agent, or Firm* — Kunzler Bean & Adamson (57) ABSTRACT

A method and a remote unit are disclosed. According to one embodiment, a method at remote unit, comprising: receiving packets from upper layer, mapping the packets to QoS flow, determining SLRB configuration corresponding to the QoS flow, establishing SLRB for the QoS flow with a peer remote unit based on the SLRB configuration, mapping the QoS flow to the SLRB, and transmitting the QoS flow with the SLRB to the peer remote unit.

20 Claims, 8 Drawing Sheets

(56) References Cited

U.S. PATENT DOCUMENTS

2022/0159776 A1* 5/2022 Li ................. H04W 28/0263
2022/0287115 A1* 9/2022 Hu ................. H04W 28/0268

OTHER PUBLICATIONS

International Searching Authority, "Written Opinion of the International Searching Authority," PCT/CN2019/100380, May 6, 2020, pp. 1-3.

3GPP, 3rd Generation Partnership Project; Technical Specification Group Radio Access Network; NR; Study on NR Vehicle-to-Everything (V2X) Release 16, 3GPP TR 38.885 V16.0.0, Mar. 2019.

OPPO, Left issue on QoS mapping for NR-V2X, 3GPP TSG-RAN WG2 Meeting #106, R2-1905566, May 13-May 17, 2019, pp. 1-4, Reno, US.

OPPO, Discussion on network involvement in unicast link establishment, 3GPP TSG-RAN WG2 Meeting #106, R2-1905580, May 13-May 17, 2019, pp. 1-6, Reno, US.

Samsung, SL RBs/LCHs and SL RB Configurations for NR Sidelink, 3GPP TSG-RAN2 106, R2-1905728, May 13-May 17, 2019, pp. 1-6, Reno, USA.

Lenovo, Motorola Mobility, Discussion on QoS management for NR V2X, 3GPP TSG-RAN WG2 Meeting #106, R2-1906139, May 13-May 17, 2019, pp. 1-3, Reno, US.

ITRI, Discussion on L2/3 protocols procedures and information for QoS support, 3GPP TSG RAN WG2 Meeting #106, R2-1906804, May 13-May 17, 2019, pp. 1-7, Reno, USA.

Huawei, Hisilicon, Details about NR SL QoS handling, 3GPP TSG-RAN WG2 Meeting #106, R2-1907454, May 13-17, 2019, pp. 1-9, Reno, USA.

LG Electronics, NR PC5 QoS modelling and operations in EPC, SA WG2 Meeting #134, S2-1907580, Jun. 24-28, 2019, pp. 1-5, Sapporo, Japan.

LG Electronics, TS 23.287 NR PC5 QoS, SA WG2 Meeting #133, S2-1905480, May 13-17, 2019, pp. 1-16, Reno, Nevada, USA.

Samsung, SL RBs/LCHs and SL RB Configurations for NR Sidelink, 3GPP TSG-RAN2 105bis, R2-1903275, Apr. 8-Apr. 12, 2019, pp. 1-6, Xian, China.

ZTE Corporations, Sanechips, Discussion on QoS support for NR V2X, 3GPP TSG RAN WG2 Meeting #106, R2-1906496, May 13-17, 2019, pp. 1-5, Reno, USA.

* cited by examiner

METHOD AND DEVICE OF SLRB CONFIGURATION FOR NR V2X SIDELINK UE

FIELD

The subject matter disclosed herein generally relates to wireless communications and, more particularly, to a method of sidelink radio bearer (SLRB) configuration for new radio (NR) vehicle-to-everything (V2X) sidelink user equipment (UE) and a device to perform the method.

BACKGROUND

The following abbreviations are herewith defined, some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), New Radio (NR), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Multiple-Input Multiple-Output (MIMO), Multiple User MIMO (MIMO), Frequency Range 1 (FR1), Frequency Range 2 (FR2), Physical Uplink Shared Channel (PUSCH), Physical Downlink Control Channel (PDCCH), Sounding Reference Signal (SRS), SRS Resource Indicator (SRI), Downlink Control Information (DCI), Resource Block (RB), Channel State Information Reference Signal (CSI-RS), Bandwidth Part (BWP), Hybrid Automatic Repeat Request Acknowledgement (HARQ-ACK), Positive Acknowledgement (ACK), Negative Acknowledgement (NACK), Physical Downlink Shared Channel (PDSCH), Code Block (CB), Code Block Group (CBG), Radio Resource Control (RRC), Identification (ID), Transmission Power Control (TPC), Radio Network Temporary Identifier (RNTI), Cell-RNTI (C-RNTI), Configured Scheduling RNTI (CS-RNTI), Transmission Mode (TM), Transmit and Receive Point (TRP), Channel State Information (CSI), Network (NW), Component Carrier (CC), Media Access Control (MAC), Control Element (CE), Sidelink Radio Bearer (SLRB), Vehicle-to-Everything (V2X), Sidelink (SL), Vehicle to Vehicle (V2V), Vehicle to Infrastructure (V2I), Quality of Service (QoS), Access Stratum (AS), Radio Access Network (RAN), Protocol Data Unit (PDU), QoS flow ID (QFI), Service Data Adaptation Protocol (SDAP), Packet Data Convergence Protocol (PDCP), Radio Link Control (RLC), Logical Channel (LCH), Next Generation eNodeB (ng-eNB), System Information Block (SIB), Packet Delay Budget (PDB), Packet Error Rate (PER), Serial Number (SN), Context Identifier (CID), Robust Header Compression (ROHC), Transmission (Tx), Reception (Rx).

V2X is a form of technology that allows vehicles to communicate with moving parts of the traffic system around them. V2X has several components. One of them is V2V, or vehicle to vehicle, which allows vehicles to communicate one another. Another component is V2I, or vehicle to infrastructure, allows vehicles to communicate with external systems such as street lights, buildings, and even cyclists or pedestrians.

In 3GPP Release 15, the V2X functionalities are expanded to support 5G. The main advantage of V2X includes support of both direct communication between vehicles (V2V) and traditional cellular-network based communication. Also, V2X provides a migration path to 5G based systems and services.

In NR, networks are able to support a massive amount of diverse V2X service data flows with different characteristics and QoS requirements in rather flexible, scalable and efficient ways. The QoS requirements are provided in terms of, e.g., data rate, packet delay or latency, and reliability for different access or priority classes.

The direct communication between vehicle and other devices uses so-called PC5 interface. PC5 refers to a reference point where the UE directly communicates with another UE over the direct channel.

SLRBs are supported for NR SL unicast, groupcast and broadcast in the AS, and SLRB configurations can be NW configured by RAN or pre-configured. It has been agreed that per-flow QoS model should be applied for all communication modes over PC5 (unicast, broadcast, groupcast) over NR radio. And the mapping between PC5 QoS flows or PC5 QoS profile (i.e. specific PC5 QoS parameters) and SLRBs for per-flow QoS model are NW configured by RAN or pre-configured. Besides, the SDAP layer is also needed for per-flow QoS model, performing PC5 QoS flow to SLRB mapping within the UE.

This invention is aimed at apparatus and methods to address the issue for SLRB configuration for NR V2X SL UE.

SUMMARY

Methods and apparatuses for power control for PUCCH transmission for multiple TRPs are disclosed.

In one embodiment, a method at a remote unit, comprises: receiving packets from upper layer, mapping the packets to QoS flow, determining SLRB configuration corresponding to the QoS flow, establishing SLRB for the QoS flow with a peer remote unit based on the SLRB configuration, mapping the QoS flow to the SLRB, and transmitting the QoS flow with the SLRB to the peer remote unit.

Preferably, the method further comprises: receiving multiple sets of SLRB configurations in SIB from a base unit, wherein the multiple sets of SLRB configurations correspond to different kinds of QoS flows, detecting if there is an available SLRB configuration corresponding to the QoS flow in the set of SLRB configurations, establishing the SLRB based on the available SLRB configuration if the available SLRB configuration is present in the multiple sets of SLRB configurations, otherwise reporting QoS flow information of the QoS flow via a RRC signaling to the base unit, and receiving an SLRB configuration corresponding to the QoS flow configured by the base unit based on the QoS flow information via a RRC signaling.

Preferably, the method further comprises: receiving an SLRB configuration and corresponding available QoS range associated with the SLRB configuration configured by the base unit via a RRC signaling, if there is an established SLRB, detecting if the QoS requirements of the QoS flow is within the available QoS range associated the established SLRB, using the established SLRB if the QoS requirements of the QoS flow is within the available QoS range associated the established SLRB, otherwise reporting QoS flow information of the QoS flow via a RRC signaling to the base unit, and receiving an SLRB configuration corresponding to the QoS flow configured by the base unit based on the QoS flow information via a RRC signaling.

In another embodiment, a remote unit, comprises a transceiver; a memory; and a processor coupled to the transceiver and the memory and configured to: control the transceiver to receive packets from upper layer, map the packets to QoS flow, determine SLRB configuration corresponding to the QoS flow, establish SLRB for the QoS flow with a peer remote unit based on the SLRB configuration, map the QoS flow to the SLRB, and control the transceiver to transmit the QoS flow with the SLRB to the peer remote unit.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not, therefore, to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entire hardware embodiment, an entire software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer-readable storage devices storing machine-readable code, computer readable code, and/or program code, referred to hereafter as "code". The storage devices may be tangible, non-transitory, and/or non-transmission. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that may contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scene, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, may be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the schematic flowchart diagrams and/or schematic block diagrams for the block or blocks.

The code may also be stored in a storage device that may direct a computer, other programmable data processing apparatus, or other devices, to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, may be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The description of elements in each figure may refer to elements of proceeding figures. Like numbers refer to like elements in all figures, including alternate embodiments of like elements.

Figure 1:
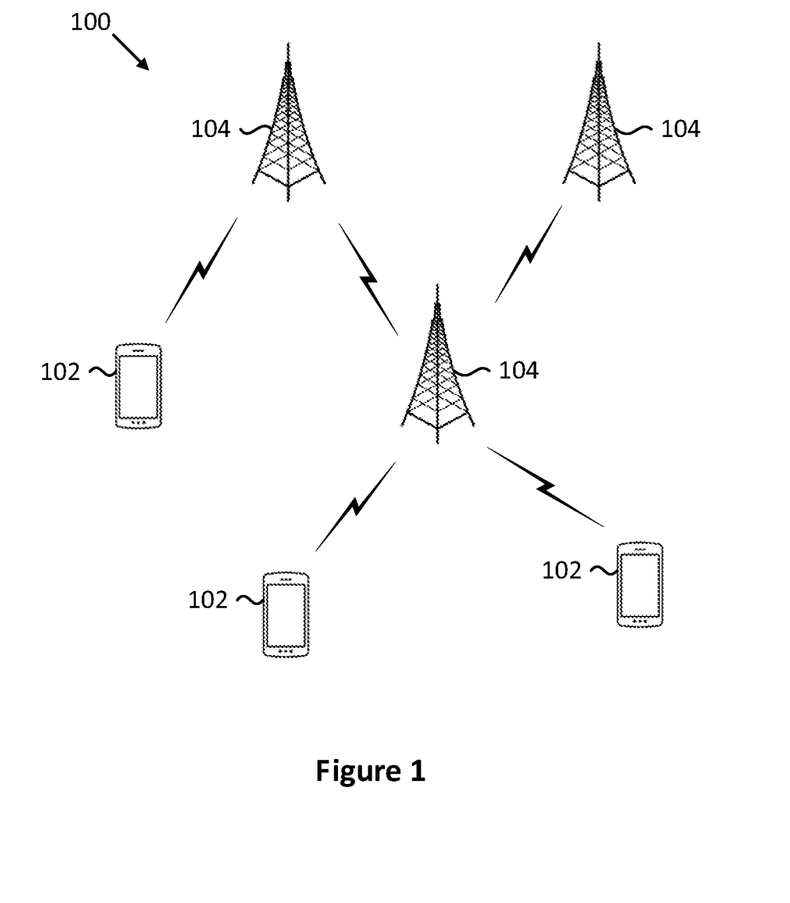
FIG. 1 is a schematic block diagram illustrating one embodiment of a wireless communication system for SLRB configuration for NR V2X SL UE.

FIG. 1 depicts an embodiment of a wireless communication system 100 for SLRB configuration for NR V2X SL UE. In one embodiment, the wireless communication system 100 includes remote units 102 and base units 104. Even though a specific number of the remote units 102 and the base units 104 are depicted in FIG. 1, it should be noted that any number of the remote units 102 and the base units 104 may be included in the wireless communication system 100.

In one embodiment, the remote units 102 may include computing devices, such as desktop computers, laptop computers, personal digital assistants ("PDAs"), tablet computers, smartphones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smartwatches, fitness bands, optical head-mounted displays, or the like. The remote units 102 may be referred to as subscriber units, mobiles, mobile stations, users, terminals, mobile terminals, fixed terminals, subscriber stations, UE, user terminals, a device, or by other terminology used in the field. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the field. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the field.

In one implementation, the wireless communication system 100 is compliant with the 3GPP 5G new radio (NR). More generally, however, the wireless communication system 100 may implement some other open or proprietary communication protocol, for example, WiMAX, among other protocols.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

Figure 2:
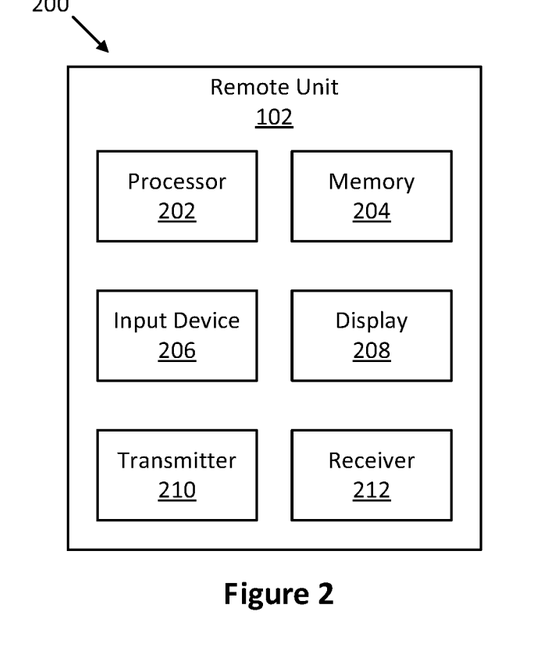
FIG. 2 is a schematic block diagram illustrating one embodiment of an apparatus that may be used for SLRB configuration for NR V2X SL UE.

FIG. 2 depicts one embodiment of an apparatus 200 that may be used for SLRB configuration for NR V2X SL UE. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smartwatch, smart glasses, a heads-up display, or the like. Further, the display 208 may be a component of a smartphone, a personal digital assistant, a television, a tablet computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the receiver 212 may be used to receive the broadcast signal. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
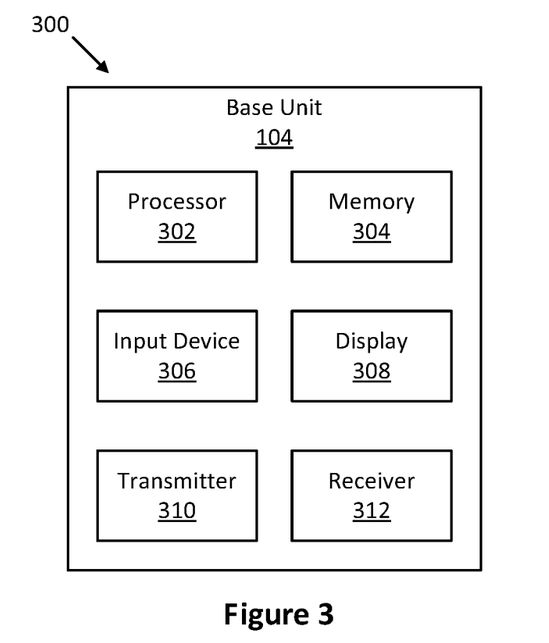
FIG. 3 is a schematic block diagram illustrating one embodiment of an apparatus that may be used for SLRB configuration for NR V2X SL UE.

FIG. 3 depicts one embodiment of an apparatus 300 that may be used for SLRB configuration for NR V2X SL UE. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 is used to transmit signaling to the remote unit. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
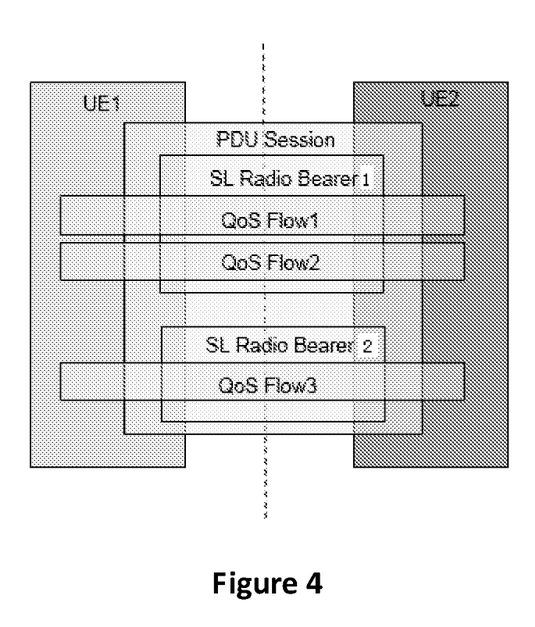
FIG. 4 is a schematic illustrating SLRB for SL unicast.

FIG. 4 is a schematic illustrating SLRB for SL unicast.

As shown in FIG. 4, in SL unicast, a PDU session is established between peer UEs, e.g. UE1 and UE2. The QoS flow is the finest granularity of QoS differentiation in a PDU session. A PDU session may contain multiple QoS flows. A QoS flow is identified within a PDU session by a QoS flow ID (QFI). A single protocol entity of SDAP is configured for each individual PDU session. The SDAP sublayer is configured by RRC signaling and the SDAP sublayer is responsible for mapping the QoS flow to the corresponding SLRB. One or more QoS flows can be mapped to the same SLRB with one QoS flow being mapped to only one SLRB. For example, QoS Flow1 and QoS Flow2 are mapped to one SLRB 1, and QoS Flow 3 is mapped to SLRB 2, as shown in FIG. 4.

Figure 5:
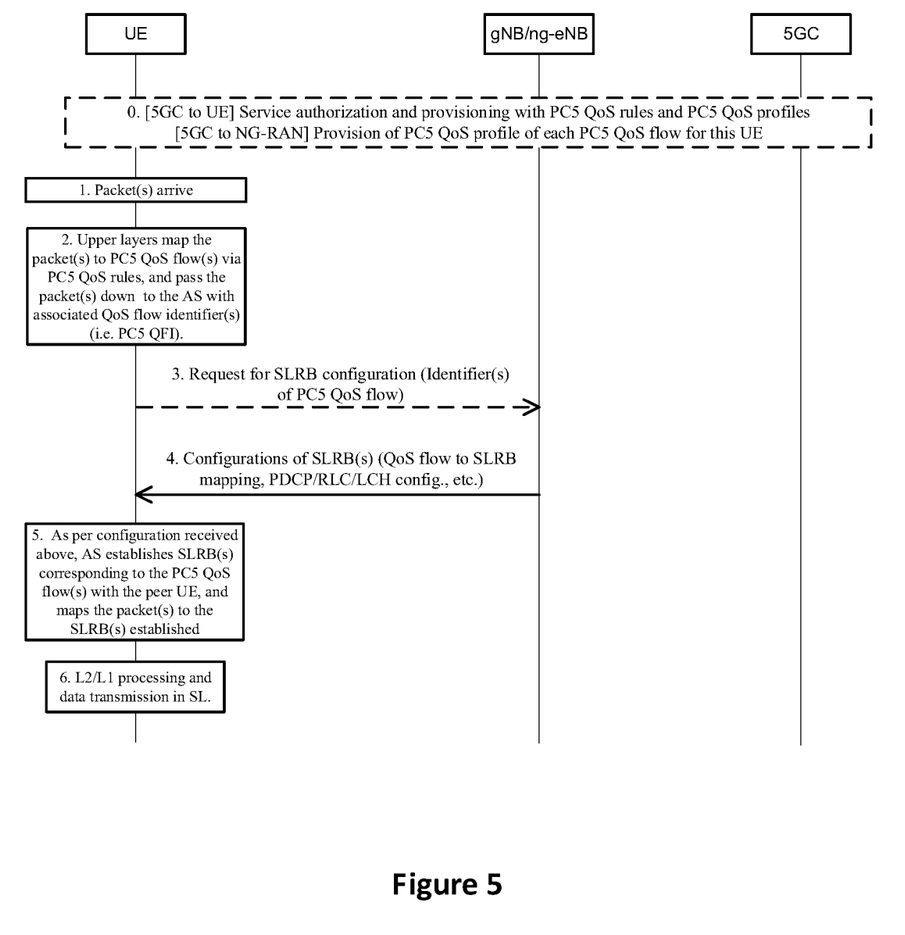
FIG. 5 is a schematic illustrating a method for UE-specific SLRB configuration for SL unicast.

FIG. 5 is a schematic illustrating a method for UE-specific SLRB configuration for SL unicast.

QoS management is relevant to V2X in the context of its use in resource allocation, congestion control, in-device coexistence, power control, and SLRB configuration. Physical layer parameters related to QoS management are the priority, latency, reliability and minimum required communication range (as defined by upper layers) of the traffic being delivered. Data rate requirements are also supported in the AS.

For SL unicast, groupcast and broadcast, QoS parameters of V2X packets are provided by upper layers to the AS. For SL unicast, the SLRBs are configured based on the signaling flows and procedures shown in FIG. 5.

In step 0 of FIG. 5, the PC5 QoS profile, i.e. a set of specific PC5 QoS parameters, and PC5 QoS rule for each PC5 QoS flow are provisioned to the UE in advance by service authorization and provisioning procedures. Similarly, PC5 QoS profile for each QoS flow is also provisioned to the gNB/ng-eNB in advance. Then, when packet(s) arrive at the UE, as shown in Step 1, upper layers map the packet(s) to PC5 QoS flow(s) via PC5 QoS rules and pass the packet(s) down to the AS with associated QoS flow identifier(s) (i.e. PC5 QFI). The UE can derive the identifier of the associated PC5 QoS flow(s) based on the PC5 QoS rules configured in Step 0, and may then report the derived PC5 QFI(s) to the gNB/ng-eNB as shown in step 3. The gNB/ng-eNB can derive the QoS profile(s) of these reported PC5 QFI(s) based on the provisioning from 5GC in step 0 and may signal the configurations of the SLRB(s) associated with the PC5 QFI(s) UE reported via RRC dedicated signaling in step 4. These SLRB configurations may include PC5 QoS flow to SLRB mapping, SDAP/PDCP/RLC/LCH configurations, etc. In step 5, the UE in the AS establishes SLRB(s) associated with the PC5 QFI(s) of the packet(s) with the peer UE as per gNB/ng-eNB configuration and maps available packet(s) to the SLRB(s) established. SL unicast transmission can then occur.

For an RRC_CONNECTED UE, when transmitting a new PC5 QoS flow, a Tx UE may report QoS information of the PC5 QoS flow via RRC dedicated signaling to the gNB/ng-eNB. The gNB/ng-eNB may provide SLRB configurations via RRC dedicated signaling based on the QoS information reported by the UE with the UE establishing/reconfiguring the SLRB only after receiving the SLRB configurations.

For RRC_IDLE/INACTIVE UE, the gNB/ng-eNB may provide SLRB configurations via V2X-specific SIB. When an RRC_IDLE/INACTIVE UE initiates the transmission of a new PC5 QoS flow, it establishes the SLRB associated with the PC5 QoS profile of the QoS flow based on an SLRB configuration in SIB.

For UE out of coverage, SLRB configurations are pre-configured. When a UE that is out of coverage initiates a transmission associated with a new PC5 QoS flow, it establishes the SLRB associated with the PC5 QoS flow based on a pre-configured information.

For SL unicast, the NW-configured/pre-configured SLRB configurations include SLRB parameters that are only related to a Tx UE, as well as SLRB parameters that are related to both the Tx UE and a Rx UE that need to be aligned with the peer UEs (i.e., Tx UE and Rx UE). Here, aligning parameters between peer UEs means the parameters are synchronized between peer UEs. The initiating UE (i.e., Tx UE) informs the peer UE (i.e., Rx UE) of SLRB parameters that are related to both Tx UE and Rx UE and need to be aligned with the peer UE.

There are some issues needed to be addressed in the current specification, specifically, the exact timing when UE initiates QoS information reporting and at what point does the UE establishes/reconfigures the SLRB after receiving the SLRB configurations.

Figure 6:
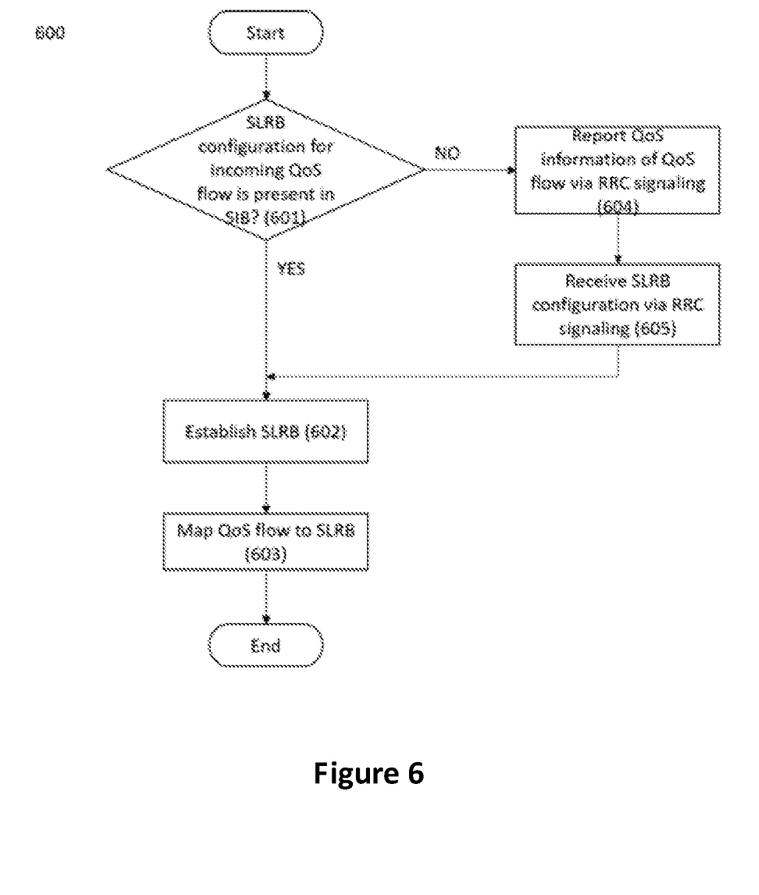
FIG. 6 is a flow chart illustrating a method of SLRB configuration for incoming QoS flow at a NR V2X SL UE according to an embodiment of the invention.

FIG. 6 is a flow chart illustrating a method of SLRB configuration for incoming QoS flow at a NR V2X SL UE according to an embodiment of the invention.

For an RRC_IDLE/INACTIVE UE, the gNB/ng-eNB may provide SLRB configurations via V2X-specific SIB. For an RRC_CONNECTED UE, in order to transmit a new PC5 QoS flow, Tx UE may report the QoS information of the PC5 QoS flow via RRC dedicated signaling to the gNB/ng-eNB. However, dedicated QoS information reporting and SLRB configurations for each incoming QoS flow may cause signaling overhead and latency problem due to the actual radio conditions and channel occupation, which is intolerable for some traffic with stringent QoS requirements.

When a NR V2X SL UE initiates a new QoS flow, the UE may first derive the identifier of the associated PC5 QoS flow(s) (i.e. PC5 QFI) based on the PC5 rules provisioned by upper layer and may then determine the SLRB configurations corresponding to the incoming QoS flow and perform SLRB to QoS flow mapping.

Prior to the procedure 600 shown in FIG. 6, gNB transmits to the UE multiple sets of SLRB configurations corresponding to different kinds of QoS flow via V2X-specific SIB. The SLRB configuration represent a mapping rule between SLRB and QoS flow. For example, SLRB 1 may correspond to QFI1 & QFI2 while SLRB 2 may correspond to QFI3 & QFI4 & QFI5. Alternatively, SLRB 1 may correspond to QoS parameters (e.g. data rate, priority level, PDB, PER, etc.) range 1 while SLRB 2 may correspond to QoS parameters range 2.

The SLRB configurations are setup by the gNB to guarantee QoS requirements of corresponding QoS flows. For example, for latency-sensitive traffic, the SLRB configurations which may guarantee QoS requirements for urgent service are configured.

Next, UE receives the multiple sets of SLRB configurations in V2X-specific SIB from gNB.

The procedure 600 represents the processing performed by a Tx UE when the Tx UE initiates a new QoS flow. At step 601, the Tx UE detects if an SLRB configuration for the incoming QoS flow is present in the multiple sets of SLRB configurations received in V2X-specific SIB.

If a corresponding SLRB configuration for the incoming QoS flow is provided in V2X-specific SIB (YES in step 601), the Tx UE may establish an SLRB associated with the incoming QoS flow with the Rx UE based on the corresponding SLRB configuration for the incoming PC5 QoS flow (step 602). Then at step 603, the Tx UE may map the PC5 QoS flow to the established SLRB.

If corresponding SLRB configuration for the incoming QoS flow is not provided in V2X-specific SIB (NO in step 601), Tx UE may report QoS information of the PC5 QoS flow via RRC dedicated signaling to gNB (step 604).

At step 605, the Tx UE receives SLRB configuration via RRC dedicated signaling. The SLRB configuration is configured by the gNB based on the QoS information reported by Tx UE in Step 604. The SLRB configuration may represent a mapping rule of PC5 QoS flow to SLRB. Then the procedure proceeds to step 602. Tx UE may establish an SLRB associated with the incoming QoS flow with the Rx UE based on the received SLRB configuration for the incoming PC5 QoS flow and map the PC5 QoS flow to the established SLRB (step 603).

As mentioned above, when the Tx UE should establish the SLRB after receiving the SLRB configures has not been defined. Furthermore, with respect to the timing for Tx UE to establish the SLRB with the Rx UE, the following timing may be considered.

When the Tx UE acquires an SLRB configuration and aligns the configuration with the Rx UE, i.e. receive the SLRB configurations acknowledge feedback from Rx UE, the Tx UE may establish the SLRB for incoming QoS flow.

Alternatively, when data of the incoming QoS flow has arrived, Tx UE may establish the SLR.

Alternatively, when the application layer indicates that data of the incoming QoS flow will arrive after a certain time, Tx UE may establish the SLRB.

In addition, when QoS flow information changes, UE may report the QoS information to the base unit and reconfigure the SLRB or update QoS flow to SLRB mapping. The reconfiguration or updating procedure is similar to the procedure 600.

Alternatively or additionally, upon receiving new packets of PC5 QoS flow from upper layer for a destination, if a Tx UE has existing established SLRB configuration corresponding to the incoming PC5 QoS flow and communication type, the Tx UE may use the existing SLRB configuration. Otherwise, the Tx UE reports QoS information of the PC5 QoS flow to gNB. An alternative procedure for this case will be described with reference to FIG. 7.

Figure 7:
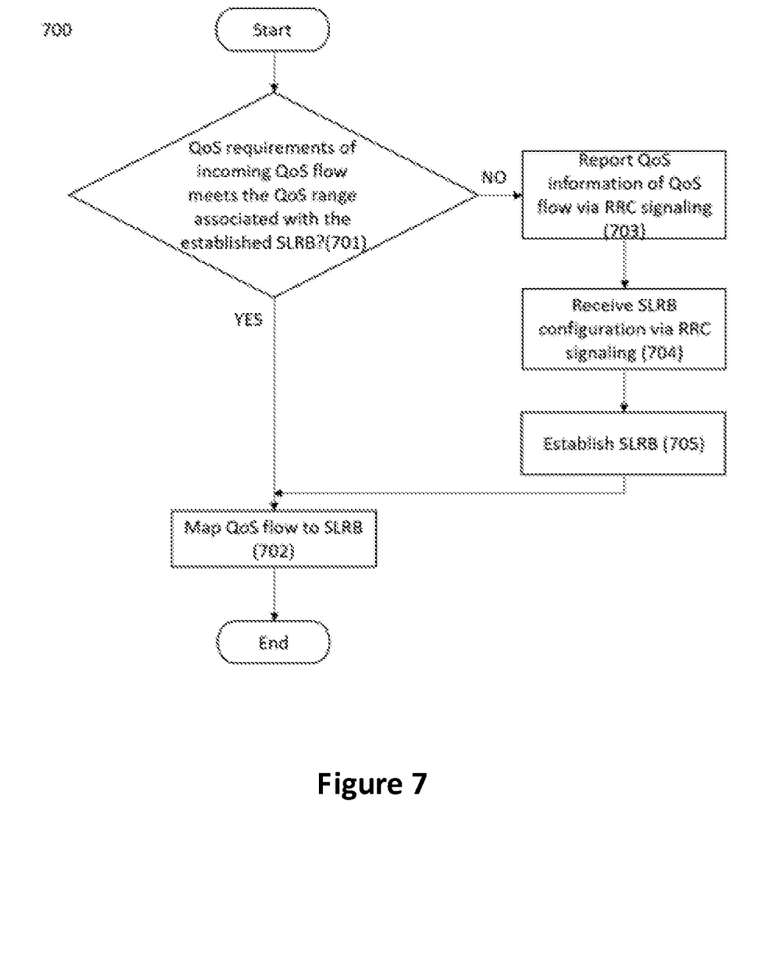
FIG. 7 is a flow chart illustrating a method of SLRB configuration for incoming QoS flow at a NR V2X SL UE according to another embodiment of the invention.

FIG. 7 is a flow chart illustrating a method of SLRB configuration for incoming QoS flow at a NR V2X SL UE according to another embodiment of the invention.

Prior to the procedure 700 shown in FIG. 7, gNB provides an SLRB configuration and corresponding QoS range associated with the configured SLRB via RRC dedicated signaling to the Tx UE.

The configuration may include dedicated SLRB for previously reported QoS flow and the QoS range that the SLRB may support. The QoS range may be one of more configured thresholds for one or more QoS parameters (e.g. data rate, priority level, PDB, PER, etc.).

The procedure 700 represents the processing performed by a Tx UE when the Tx UE initiates a new QoS flow.

At step 701, the Tx UE detects if the QoS requirements of incoming QoS flow meets the configured QoS range associated with the established SLRB.

If the QoS requirements are within the configured QoS range associated with the established SLRB (YES in step 701), the Tx UE uses the existing established SLRB. Specifically, the Tx UE may map the incoming PC5 QoS flow to the existing established SLRB (step 702).

If the QoS requirements are not within the configured QoS range associated with the established SLRB (NO in step 701), the procedure proceeds to step 703.

At step 703, the Tx UE reports QoS information of the PC5 QoS flow to the gNB.

Next, the Tx UE receives a new SLRB configuration configured by gNB based on the QoS information reported by the Tx UE via an RRC dedicated signaling (step 704).

Next, the Tx UE may establish an SLRB associated with the incoming QoS flow with a Rx UE based on the received SLRB configuration (step 705) and map the incoming QoS flow to the SLRB established (step 702).

Here, once a dedicated SLRB configuration has been provided by the gNB (step 704), the Tx UE may establish SLRB with the Rx UE considering the following conditions.

As mentioned above, when the Tx UE should establish the SLRB after receiving the SLRB configures has not been defined. Furthermore, with respect to the timing for Tx UE to establish the SLRB with the Rx UE, the following timing may be considered.

When the Tx UE acquires SLRB configuration and aligns the configuration with the Rx UE, i.e. receive the SLRB configurations acknowledge feedback from Rx UE, the Tx UE may establish this SLRB for incoming QoS flow.

Alternatively, when data of the incoming QoS flow is arrival, the Tx UE establishes this SLRB.

Alternatively, when the application layer indicates that data of the incoming QoS flow will arrive after a certain time, the Tx UE may establish this SLRB.

The procedure 700 represents the processing performed by a Tx UE to configure a SLRB when the Tx UE initiates a new QoS flow. In addition, when QoS flow information changes, the Tx UE may report the QoS information to the base unit and reconfigure the SLRB or update QoS flow to SLRB mapping. The reconfiguration or updating procedure is similar to the procedure 700.

The procedure 600 and the procedure 700 may be executed in a parallel way or executed in a combined way. Here, a combined way means that UE determine SLRB configuration according to procedure 600 and procedure 700 simultaneously. When executed in a combined way, the SLRB configuration determined by procedure 600 has higher priority than the SLRB configuration determined by the procedure 700. That is to say, if both the SLRB configuration decided by procedure 600 and the SLRB configuration decided by procedure 700 are available. UE use the SLRB configuration determined by procedure 600.

Figure 8:
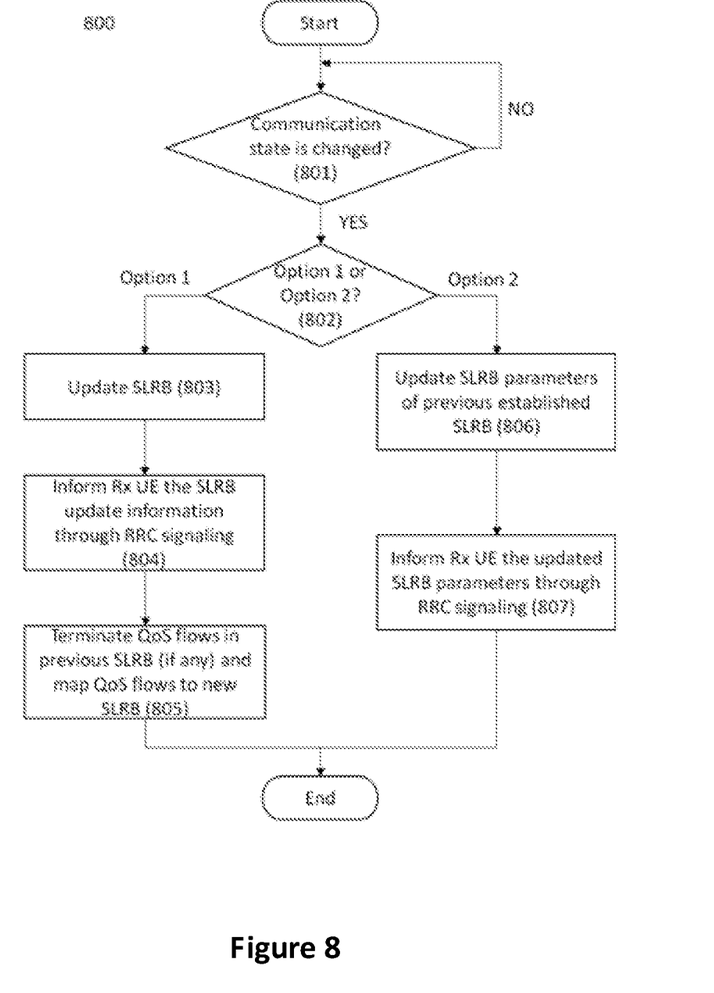
FIG. 8 is a schematic illustrating a method of SLRB configuration for ongoing QoS flow at a NR V2X SL UE according to still another embodiment of the invention.

FIG. 8 is a flow chart illustrating a method of SLRB configuration for ongoing QoS flow at a NR V2X SL UE according to still another embodiment of the invention. The ongoing QoS flow means that the packets of the QoS is being transmitted.

While service is ongoing, the state of Tx UE may changes, for example, 1) transferring from RRC_CONNECTED to RRC_IDLE/INACTIVE or out of coverage, or vice versa, 2) the communication mode of the Tx UE changes from mode1 to mode2, or vice versa. Here, in mode 1, base station schedules SL resource(s) directly to be used by UE for SL transmission. Mode 1 is more suitable for the service with high reliability or more stringent QoS requirements. In mode 2, UE determines SL transmission resource(s) within SL resources configured by base station/network or pre-configured SL resources. Mode 2 is more suitable for the 'best-effort' service, or service with low latency. Since the SLRB configuration in different UE state may be different for better guaranteeing the QoS requirement of ongoing service. It is necessary for NR V2X UE to maintain the SLRB configurations and ensure service continuity.

The way to maintain an SLRB for an ongoing QoS flow when UE state changes will be described with reference to FIG. 8.

The procedure 800 shown in FIG. 8 starts at step 801.

At step 801, the Tx UE determines whether the communication state of the UE has changed. For example, when the Tx UE measures, during a configured time period, the signal strength from a serving cell and determines that it is lower than a specific threshold, or when the communication mode of the UE for one specific QoS flow or multiple QoS flows changes from mode1 to mode2, the Tx UE determines that the communication state has been changed.

If the communication state of the Tx UE has been changed (YES in step 801), there may be two options for the Tx UE to perform, option 1: updating the SLRB, and option 2: keeping the SLRB and updating the SLRB parameters. At step 802, the Tx UE may chose to perform option 1 o option 2.

Option 1: The Tx UE performs SLRB updating (step 803). Here, SLRB updating means switching to another existing SLRB (referring back to FIG. 4 which shows 2 SLRBs) or establishing a new SLRB based on pre-configuration. In this case, the SLRB ID changes. In the context, the SLRB used before the communication state has changed is referred to previous SLRB, while the SLRB after the updating process is referred to as updated SLRB.

At step 804, the Tx UE informs the Rx UE of the updated SLRB information through PC5-RRC signaling. The updated SLRB information includes new SLRB parameters related to both Tx UE and Rx UE or related to Rx UE only, as well as the packet ratios of the QoS flow(s) which need to be transmitted in updated SLRB and the QoS flow(s) which need to transmitted continually in the previous SLRB.

At step 805, Tx UE terminates one or more QoS flows in the previous SLRB when determining packets are transmitting in existing SLRB, and then maps all of the QoS flows to the updated SLRB.

In option 1, the SLRB is switched to another existing SLRB or a new established SLRB when the communication state is changed, causing the SLRB ID and the SLRB parameters to change and the updated SLRB to be transmitted to the Rx UE.

Option 2: Instead of updating the SLRB, UE may keep using the previous SLRB when Tx UE determines that the communication state has been changed. In this case, the SLRB ID is not changed. However, some of the SLRB parameters are UE-specific, for example, the parameters related to SR/BSR reported. Therefore, a part of the SLRB parameters of the previous need to be updated.

As shown in the option 2 branch, at step 806, the Tx UE updates partial SLRB parameters of the current SLRB. For example, clearing or setting to null for the parameters related to SR/BSR reported or other UE-specific SLRB parameters.

Next, at step 807, the Tx UE informs the Rx UE about the updated SLRB parameters of the SLRB through RRC signaling.

In option 2, when the communication state of the Tx UE changes SLRB remain the same. The SLRB ID also stays the same. The only thing that is adjusted upon detected change in the communication state is a part of the SLRB parameters being adjusted. These updated SLRB parameters are then transmitted to the Rx UE.

Figure 9:
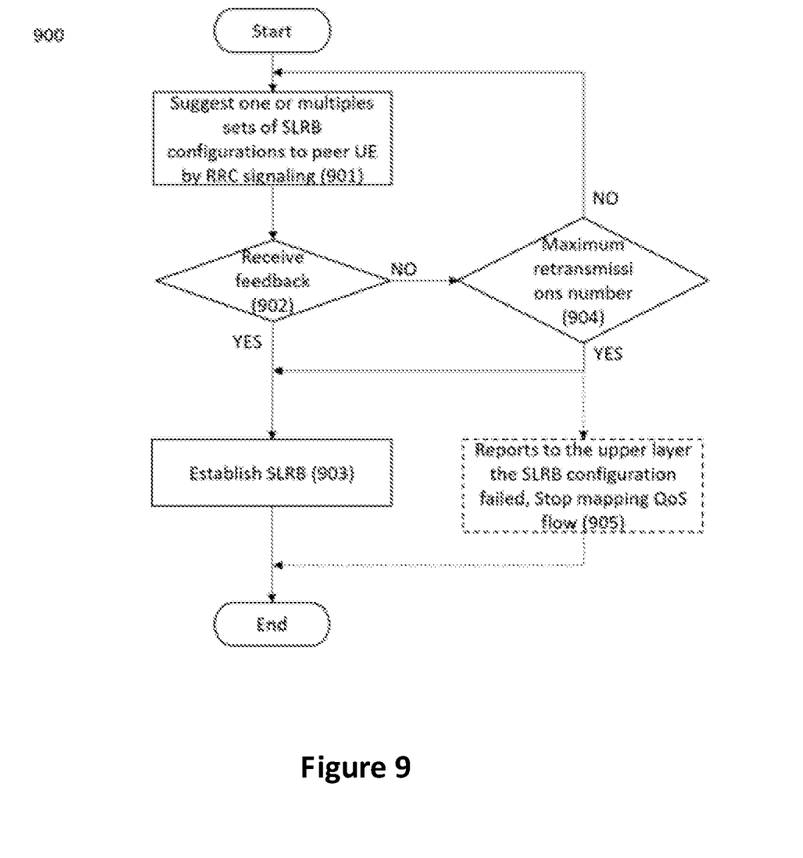
FIG. 9 is a flow chart illustrating a method of SLRB configuration alignment between peer UEs according to a further embodiment of the invention.

FIG. 9 is a flow chart illustrating a method of SLRB configuration alignment between peer UEs according to a further embodiment of the invention.

For SL unicast communication, SLRB configurations include SLRB parameters that are only related to Tx UE, as well as the SLRB parameters that are related to both Tx UE and Rx UE and need to be aligned with the peer UEs. The Tx UE needs to transmit one or multiple sets of SLRB configurations including the SLRB parameters to Rx UE to align with the Rx UE about the SLRB parameters related to both Tx UE and Rx UE.

The way to align the SLRB configurations between Tx UE and Rx UE for SL unicast communication will be described with reference to FIG. 9.

The procedure 900 shown in FIG. 9 begins at step 901. At step 901, the initiating UE transmits one or multiples sets of suggested SLRB configurations to peer UE by PC5-RRC signaling. The one or multiple sets of suggested SLRB configurations include, but not limited to, SLRB IDs, corresponding QoS flow information and SLRB parameters related to both Tx UE and Rx UE.

At step 902, the Tx UE detects whether the feedback is received from the Rx UE based on Rx UE determination as to whether to accept or reject the suggested SLRB configurations based on its own assessment or condition, e.g. UE capability, local CBR measurements, etc. Rx UE transmits feedback to the Tx UE.

The Rx UE may transmit a list containing acknowledged SLRB(s) to the Tx UE, including associated confirmed SLRB ID. For one specific QoS flow which adapts to multiple kinds of SLRB configuration in PC5-RRC message, Rx UE selects an appropriate configuration and acknowledges the associated SLRB ID. If no SLRB ID is included in the response message, it means none of the suggested SLRB configurations was accepted by the Rx UE.

Alternatively, the Rx UE may transmit a reject SLRB list to the Tx UE, including rejected SLRB ID and corresponding cause associated with each rejected SLRB ID.

Alternatively, the Rx UE may transmit reject SLRB list to the Tx UE, without corresponding cause.

Alternatively, the Rx UE may also propose an alternative configuration for a rejected SLRB ID.

Alternatively, the Rx UE may transmit both acknowledge SLRB list and reject SLRB list to the Tx UE.

If the Tx UE receives the feedback from the Rx UE during a configured time window (YES in step 902), an SLRB associated with the incoming QoS flow is established with the suggested configuration based on the feedback and the packets are mapped to the established SLRB (step 903).

If the Tx UE does not receive the feedback from the Rx UE during the configured time window (NO in step 902), the Tx UE determines whether the number of retransmissions has reached to a configured maximum retransmissions number (step 904).

If the number of retransmissions has not reached to the configured maximum transmission number (NO in step 904), the Tx UE initiates a new transmission containing the SLRB configuration information.

If the number of retransmissions has reached to the configured maximum retransmissions number (YES in step 904), the procedure may proceed to step 903. At step 903, an SLRB associated with the incoming QoS flow is established with a pre-configured default SLRB configuration or a Tx UE suggested SLRB configuration by default, and the packets are mapped to the established SLRB.

Alternatively, if the number of retransmissions has reached the configured maximum retransmissions number (YES in step 904), the procedure may proceed to step 905.

At step 905, Tx UE reports to the upper layer that the SLRB configuration is failed and stop mapping the QoS flow as shown in the dotted box.

Here, the Rx UE may trigger SLRB release or re-configuration to the Tx UE if QoS is unfulfilled for a certain time.

For the above embodiments, the configured or pre-configured SLRB parameters may be SDAP related parameters, PDCP related parameters, RLC related parameters, or MAC related parameters, including at least one of the flowing parameters: SLRB ID, QoS flow to SLRB mapping, discard timer, PDCP SN size, Max CID, ROHC profile, T-reordering timer, OutofOrderDelivery, RLC mode, RLC SN field length, T-Reassembly timer, T-PollRetransmit timer, Poll PDU, Poll Byte, MaxRetxTheshold, T-Status Prohibit timer, logical channel identity, logical channel group, priority, Prioritized Bitrate, BucketSizeDuration, ConfiguredGrantType1Allowed, Scheduling request ID, logicalchannelSR-DelayTimerApplied, HARQ retransmissions, etc.

The SLRB parameters related to both Tx UE and Rx UE and needed to be aligned between Tx UE and Rx UE may be at least one of the following parameters: SIRB ID, PDCP SN size, Max CID, ROHC profile, RLC mode, RLC SN field length, HARQ retransmissions, etc.

Model-specific SLRB parameters may be at least one of the following parameters: logical channel identity, logical channel group, configuredGrantType1Allowed, Scheduling Request ID, LogicalChannelSR-DelayTimeApplied, etc.

It should be noted that the steps described above are not all necessary. It is possible to perform only some of these steps. The order of steps is also not mandatory but may be performed in other orders or in parallel. The execution of some steps requires signaling. The collective signaling described in the specification as being used for multiple steps may be replaced with separate signaling for individual step.

With the disclosure described in the invention, the solution for initiating UE to determine the SLRB configuration in a simpler way is proposed. gNB configures multiple sets of SLRB configurations corresponding to different kinds of QoS flow via SIB. Initiating UE detects whether corresponding SLRB configuration for the incoming PC5 QoS flow is in SIB firstly. If so the UE uses the SLRB configuration. Otherwise, UE initiates a new QoS information reporting to gNB. Alternatively, gNB configures SLRB configuration and corresponding QoS range associated with the configured SLRB via RRC dedicated signaling. If the QoS requirements of incoming QoS flow meet the configured QoS range associated with the established SLRB, UE uses the existing established SLRB configuration. Otherwise, UE initiates a new QoS information reporting to gNB. With the disclosure described in the invention, the solution for maintaining SLRB configuration when the state of SL UE changes is proposed. UE may keep using previous established SLRB (with same SLRB ID), but may update partial parameter. Alternatively, Tx UE performs SLRB update or establishes a new SLRB based on pre-configuration (with changed SLRB ID), and informs Rx UE the update. With the disclosure described in the invention, the solution for the SLRB parameters alignment between initiating UE and peer UE is proposed. Rx UE determines whether to accept or reject the suggested SLRB configurations based on its own assessment or condition.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
receiving packets from an upper layer;
mapping the packets to a quality of service (QOS) flow;
determining a sidelink radio bearer (SLRB) configuration corresponding to the QoS flow;
establishing a SLRB for the QoS flow with a peer remote unit based on the SLRB configuration;
mapping the QoS flow to the SLRB;
transmitting the QOS flow with the SLRB to the peer remote unit;
updating the SLRB configuration when a state of the UE changes; and
transmitting information on the updated SLRB configuration to the peer remote unit.

2. The method of claim 1, further comprising:
receiving multiple sets of SLRB configurations in a system information block (SIB) from a base unit,
wherein the multiple sets of SLRB configurations correspond to different kinds of QoS flows.

3. The method of claim 2, further comprising:
detecting if there is an available SLRB configuration corresponding to the QoS flow in the set of SLRB configurations;
establishing the SLRB based on the available SLRB configuration if the available SLRB configuration is present in the multiple sets of SLRB configurations, otherwise reporting QoS flow information of the QoS flow via a radio resource control (RRC) signaling to the base unit; and
receiving an SLRB configuration corresponding to the QoS flow configured by the base unit based on the QoS flow information via a RRC signaling.

4. The method of claim 3, wherein, if the UE determines the SLRB configuration and aligns the SLRB configuration with the peer remote unit, the UE establishes the SLRB associated with the QoS flow with the peer remote unit based on the SLRB configuration.

5. The method of claim 3, wherein, if the packets of the QoS flow arrives, the UE establishes the SLRB associated with the QOS flow with the peer remote unit based on the SLRB configuration.

6. The method of claim 3, wherein, if the QoS flow information changes, the UE reports the QoS information to the base unit and updates the QoS flow to SLRB mapping.

7. The method of claim 1,
wherein the changing of the state of the UE comprises a signal strength from a serving cell being lower than a threshold for a certain time period, the UE's communication mode changing between mode 1 and mode 2, the UE transferring between RRC_IDLE/INACTIVE and RRC_CONNECTED, the UE moving between in coverage and out of coverage, or some combination thereof.

8. The method of claim 7, wherein:
the method further comprises using the SLRB without the updated configuration when the state of the UE changes;
updating the SLRB configuration comprises updating parameters of the previous SLRB; and
transmitting information on the updated SLRB configuration to the peer remote unit comprises informing the updated parameters to the peer remote unit via a RRC signaling.

9. The method of claim 7, wherein:
informing information on the updated SLRB to the peer remote unit comprises informing information on the updated SLRB to the peer remote unit via a RRC signaling;
updating the SLRB comprises switching to another existing SLRB or establishing a new SLRB based on pre-configuration; and
the information on the updated SLRB includes at least one of SLRB parameters of the updated SLRB related to both the UE and the peer remote unit, SLRB parameters of the updated SLRB related to the peer remote unit only, packet ratios of the QoS flow needed to be transmitted in the updated SLRB and previous SLRB respectively.

10. The method of claim 9, further comprising:
terminating the QoS flow in the previous SLRB; and
mapping the QoS flow to the updated SLRB.

11. A user equipment (UE), comprising:
at least one memory; and
at least one processor coupled with the at least one memory and configured to cause the UE to:
receive packets from an upper layer;
map the packets to a quality of service (QOS) flow;
determine a sidelink radio bearer (SLRB) configuration corresponding to the QoS flow;
establish an SLRB for the QoS flow with a peer remote unit based on the SLRB configuration;
map the QoS flow to the SLRB;
transmit the QoS flow with the SLRB to the peer remote unit;
update the SLRB configuration when a state of the UE changes; and
transmit information on the updated SLRB configuration to the peer remote unit.

12. The UE of claim 11, wherein the at least one processor is further configured to cause the UE to:
receive multiple sets of SLRB configurations in SIB from a base unit,
wherein the multiple sets of SLRB configurations correspond to different kinds of QOS flows.

13. The UE of claim 12, wherein the at least one processor is further configured to cause the UE to:
detect if there is an available SLRB configuration corresponding to the QoS flow in the set of SLRB configurations;
establish the SLRB based on the available SLRB configuration if the available SLRB configuration is present in the multiple sets of SLRB configurations, otherwise report QoS flow information of the QoS flow via a RRC signaling to the base unit; and
receive an SLRB configuration corresponding to the QoS flow configured by the base unit based on the QoS flow information via a RRC signaling.

14. The UE of claim 13, wherein, if the UE determines the SLRB configuration and aligns the SLRB configuration with the peer remote unit, the UE establishes the SLRB associated with the QoS flow with the peer remote unit based on the SLRB configuration.

15. The UE of claim 13, wherein, if the packets of the QoS flow arrives, the UE establishes the SLRB associated with the QoS flow with the peer remote unit based on the SLRB configuration.

16. The UE of claim 13, wherein, if the QoS flow information changes, the UE reports the QoS information to the base unit and updates the QoS flow to SLRB mapping.

17. The UE of claim 11, wherein:
the changing of the state of the UE comprises a signal strength from serving cell being lower than a threshold for a certain time period, the UE's communication mode changing between mode 1 and mode 2, the UE transferring between RRC_IDLE/INACTIVE and RRC_CONNECTED, the UE moving between in coverage and out of coverage, or some combination thereof.

18. The UE of claim 17, wherein:
the at least one processor is further configured to cause the UE to use the previous SLRB when the state of the UE changes;
causing the UE to update the SLRB configuration comprises causing the UE to update parameters of the previous SLRB; and
causing the UE to transmit information on the updated SLRB configuration to the peer remote unit comprises causing the UE to inform the updated parameters to the peer remote unit via a RRC signaling.

19. The UE of claim 17, wherein the at least one processor is further configured to cause the UE to:
causing the UE to inform information on the updated SLRB to the peer remote unit comprises informing information on the updated SLRB to the peer remote unit via a RRC signaling,
causing the UE to update the SLRB comprises causing the UE to switch to another existing SLRB or establish a new SLRB based on pre-configuration, and
the information on the updated SLRB includes at least one of SLRB parameters of the updated SLRB related to both the UE and the peer remote unit, SLRB parameters of the updated SLRB related to the peer remote unit only, packet ratios of the QoS flow needed to be transmitted in the updated SLRB and previous SLRB respectively.

20. The UE of claim 19, wherein the at least one processor is further configured to cause the UE to:
  terminate the QoS flow in the previous SLRB; and
  map the QoS flow to the updated SLRB.

* * * * *